United States Patent [19]
Maehara et al.

[11] Patent Number: 5,258,881
[45] Date of Patent: Nov. 2, 1993

[54] TAPE CASSETTE LOADING SYSTEM IN RECORDING AND/OR REPRODUCING APPARATUS

[75] Inventors: Masanori Maehara; Eiji Ohshima; Toshio Mamiya; Yoshio Kusui, all of Kanagawa, Japan

[73] Assignee: Sony Corporation, Japan

[21] Appl. No.: 949,355

[22] Filed: Sep. 23, 1992

Related U.S. Application Data

[63] Continuation of Ser. No. 744,688, Aug. 9, 1991, abandoned, which is a continuation of Ser. No. 277,558, Nov. 29, 1988, abandoned.

[51] Int. Cl.⁵ .......................................... G11B 15/665
[52] U.S. Cl. ....................................................... 360/85
[58] Field of Search ....... 360/85, 95, 71, 130.2–130.24

[56] References Cited

U.S. PATENT DOCUMENTS

| | | | |
|---|---|---|---|
| 4,520,411 | 5/1985 | Ohshima | 360/85 |
| 4,620,245 | 10/1986 | Shimiza | 360/85 |
| 4,803,574 | 2/1989 | Konishi et al. | 360/85 |

Primary Examiner—Robert S. Tupper
Attorney, Agent, or Firm—Ronald P. Kananen

[57] ABSTRACT

A tape cassette loading system for wrapping a magnetic tape about a magnetic rotary head drum of a recording and/or reproducing apparatus is provided. The loading system includes two tape guiding elements for withdrawing the tape from a tape cassette towards the rotary head drum and their tape guiding track members provided around the drum in order to define tape loading paths. One of the tape loading path slopes downwardly from a loading stand-by state position. The other tape loading path slopes upwardly from the loading stand-by state position. The movement of the two guiding elements traveling in their loading paths allows the tape to be wrapped helically about the drum. The height drum may therefore be reduced and the recording and/or reproducing apparatus can be made smaller.

16 Claims, 3 Drawing Sheets

TAPE CASSETTE LOADING SYSTEM IN RECORDING AND/OR REPRODUCING APPARATUS

This application is a continuation of application Ser. No. 07/744,688 filed Aug. 9, 1991, now abandoned, which is a continuation of application Ser. No. 07/277,558 filed Nov. 29, 1988, now abandoned.

BACKGROUND OF THE INVENTION

The present invention relates generally to a tape cassette loading system of a recording and/or reproducing apparatus such as a video tape recorder (VTR). More specifically, the invention relates to an improved loading mechanism in which the amount of unused space is decreased thus allowing the overall size of the recording and/or reproducing apparatus to be reduced.

VTR and digital recording type PCM recorders generally comprise a rotary head which rotates diagonally relative to the traveling direction of the magnetic tape and thereby records information in diagonal tracks on the magnetic tape. The helical wrapping of the magnetic tape about the head drum requires a special loading system.

In conventional tape cassette loading systems, a so-called M type loading system and a so-called U type loading system are known. In the U type loading system, the axis of the rotary head drum is at essentially right angles to the mechanical chassis. Tape guiding posts, for withdrawing the magnetic tape from the tape cassette case and guiding it towards the rotary head drum, are provided at a tape supply reel side and a take-up reel side respectively. One of these guiding posts moves around the rotary head drum parallel to the plane of the chassis, while the other guiding post moves upwardly or downwardly around the head drum so as to wrap the tape helically thereabout. On the other hand, in the M type loading system, the rotary head drum is diagonally mounted on the mechanical chassis, and the tape guiding posts are arranged vertically on the mechanical chassis. The inclination of axis of the rotary head drum to that of the tape guiding posts permits the helical wrapping of the tape about at least a portion of the periphery of drum.

In recent years, the overall size and thickness of a portable VTR camera has decreased. When miniaturizing the conventional VTR cameras, the following objects are encountered.

The rotary head drum takes up a relatively great deal of space. Therefore, a cassette loading system in which the rotary head drum is partially received into the tape access portion of a magnetic tape cassette case is sought. The relatively greater height of the rotary head drum of the M-type loading due to its inclination does not permit the head drum to be easily received in the access portion of the tape cassette. On the other hand, in the U type loading system wherein the rotary head drum is mounted at right angles to a mechanical chassis, only one tape guiding post provided at either the supply reel side or the take-up reel side moves upwardly or downwardly relative to the rotary head drum so as to wrap the magnetic tape helically thereabout. Therefore, the height of the rotary head drum is relatively great relative to that of the tape access portion of the tape cassette case and therefore the portion of the drum that is not received within tape cassette's access portion remains relatively large.

SUMMARY OF THE INVENTION

It is, accordingly, an object of the present invention to provide a tape cassette loading system for a recording and/or reproducing apparatus using a rotary magnetic head drum in which the volume of space occupied by the portion of the head drum which is not received within the access portion of a tape cassette casing during operation is reduced.

According to one aspect of the present invention, there is provided a magnetic tape arrangement, for a recording and/or reproducing apparatus, for wrapping a magnetic tape helically about a portion of the periphery of a magnetic rotary head drum, comprising a first guiding element for withdrawing a section of the magnetic tape from a tape casing received within the apparatus and shifting it diagonally to a first point defined above a plane including the longitudinal center line of the tape stored within the casing and on the peripheral surface of the magnetic rotary head drum, and a second guiding element for withdrawing a section of the tape from the tape casing and shifting it diagonally to a second point defined below the plane and on the peripheral surface of the drum.

According to a further aspect of the invention, there is provided a magnetic tape arrangement, for a recording and/or reproducing apparatus, for wrapping a portion of a magnetic tape stretched through an access opening provided in a tape cassette casing onto a magnetic rotary head drum arranged substantially at a right angle to the mechanical chassis of the apparatus, comprising a first guiding element for withdrawing a section of the magnetic tape stored within the casing received within the apparatus, the first element shifting the withdrawn section below the center line of the magnetic tape stored within the casing and wrapping it helically about the peripheral surface of the drum, and a second guiding element for withdrawing the a section of the magnetic tape, the second element shifting the withdrawn section above the center line of the magnetic tape stored within the casing and wrapping it helically about the peripheral surface of the drum.

According to another aspect of the invention, there is provided a magnetic tape loading system, for a recording and/or reproducing apparatus, in which a magnetic tape is wrapped helically about a portion of the periphery of a magnetic rotary head drum, comprising means for loading a magnetic tape cassette casing for the magnetic tape to a predetermined position in the vicinity of the magnetic rotary head drum within the apparatus, a first guiding element for withdrawing a section of the magnetic tape from the casing and shifting it diagonally to a first point defined above a plane including the longitudinal center line of the tape stored within the casing and on the peripheral surface of the magnetic rotary head drum, and a second guiding element for withdrawing a section of the tape from the casing and shifting it diagonally to a second point defined below the plane and on the peripheral surface of the drum.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

DESCRIPTION OF THE PREFERRED EMBODIMENTS

Figure 1:
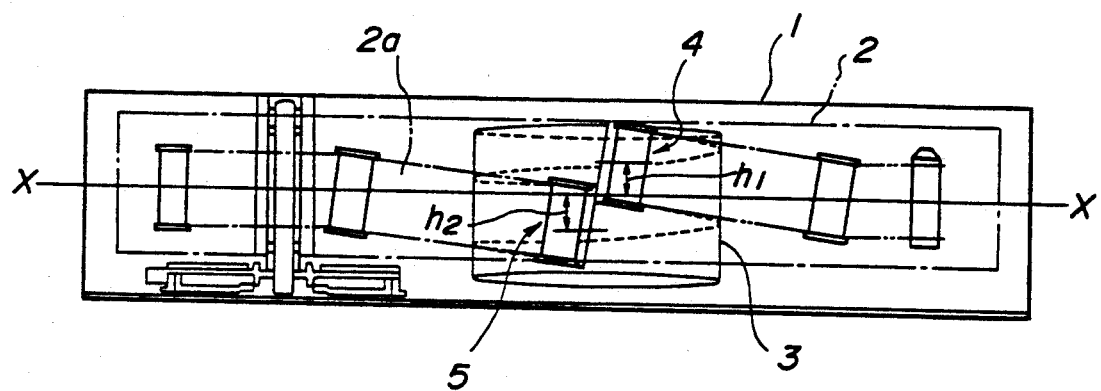
FIG. 1 is a schematic view which shows helical wrapping, according to the invention, of a magnetic tape about a rotary head drum.

Referring now to the drawings, particularly to FIG. 1, there is illustrated a tape cassette loading system according to the present invention. A solid line indicated by numeral 1 defines the housing of the mechanical elements of the tape transport. It will be noted that a magnetic tape cassette 2 indicated by a dashed line occupies the greater part of the space.

When the magnetic tape cassette 2 is loaded into a recording and/or reproducing apparatus, a pivotal closure lid (not shown) is automatically pivoted away from the front surface of the tape cassette case 2 to expose a magnetic tape 2a. The exposed tape 2a is then withdrawn from the tape cassette 2 by a tape guiding element 4 positioned at the supply reel table side (visible in FIG. 2) and a tape guiding element 5 positioned at the take-up reel side (visible in FIG. 2) to be wrapped helically about a portion of the periphery of a rotary head drum 3 at a predetermined angle. The tape guiding element 4, as will be described hereafter, simultaneously moves upwardly with respect to a longitudinal center line X—X of the magnetic tape 2a stored within the tape cassette 2 and becomes inclined relative to the drum 3. The magnetic tape 2a is wrapped helically on the drum 3 at an angle suitable for recording or reproducing video signals. Simultaneously, the tape guiding element 5 moves downwardly with respect to the center line X—X and becomes inclined at the same angle as the element 4. The drum 3 shown in FIG. 1 is specially adapted for 8 mm portable video camera. In a conventional 8 mm video camera, a rotary magnetic head drum is 40 mm in diameter. The magnetic tape is generally wrapped 221 degrees about the drum. PCM audio recording is performed within a 36 degree portion of the 221 degrees. The size of drum 3, in this embodiment, is reduced in order to reduce the overall size of the video camera. The diameter of the drum 3 is 26 mm. Thus, due to the reduced size, the magnetic tape is wrapped about 340 degrees about the drum 3. It will be appreciated that the guiding elements 4 and 5 are adjacent to each other at their loading end positions.

Moreover, in this embodiment, to avoid damage to the tape 2a, the rotary head drum 3 is rearwardly inclined slightly. The drum 3 may however be disposed at a right angle to the chassis in other embodiments of the invention.

The rotary head drum 3 comprises a rotary cylinder with a plurality of magnetic heads and a stationary cylinder. The rotary cylinder includes a rotor having a permanent magnet as a driver of a coreless motor. The stationary cylinder includes a stator which generates a rotating magnetic field and a rotary transducer. The rotary head drum is thinner than those of conventional prior art devices and is partly received within the tape access portion of the cassette case 2 during recording and/or reproducing video signals in order to minimize the size of the recording and/or reproducing apparatus.

Figure 2:
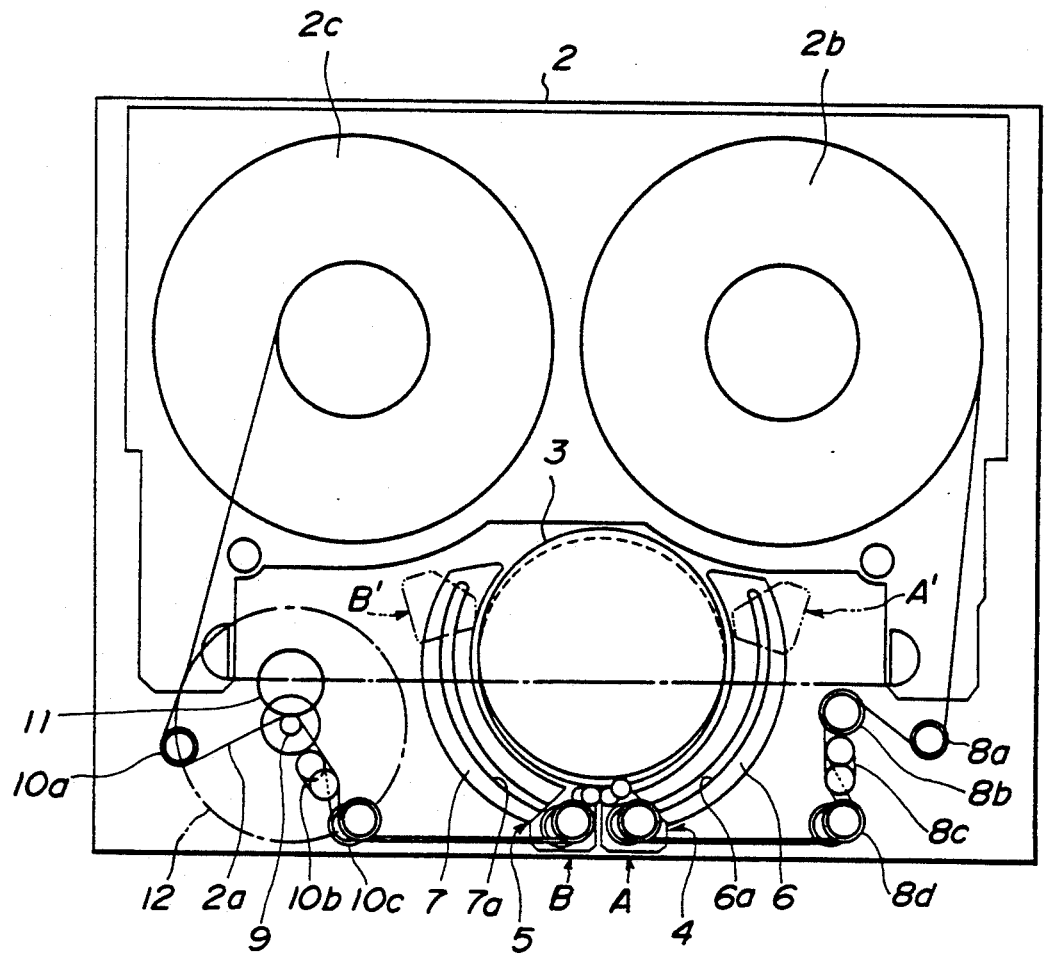
FIG. 2 is a simplified plane view which shows a first embodiment of a loading mechanism according to the invention.

Referring to FIG. 2, a tape cassette loading mechanism according to the invention is illustrated. The tape guiding element 4 moves along a guide groove 6a provided in a guide track member 6 towards a loading end position A from a stand-by position A'. When the tape cassette is inserted into a holder therefor provided in the recording and/or reproducing apparatus and then setting the holder in place, the guiding element 4 is moved from the tape access portion to the rotary head drum 3 by a driver system as will be described hereinafter. Similarly to the guiding element 4, the guiding element 5 moves from stand-by position B' along a path defined about the periphery of the rotary head drum 3 to a loading end position B, by which movement the magnetic tape 2a is withdrawn by guide rollers 8a, 8b, 8c, and 8d. Guide rollers 10a, 10b, and 10c guide the tape 2a onto a capstan 9 where it is engaged by a pinch roller 11. Thus, wrapping of the tape 2a on the rotary head drum 3 is achieved. The end portion of the guide track member 6 at the side of the tape cassette case 2 is arranged at the same height as that of the magnetic tape 2a so as to allow the tape guiding element 4 to draw out the tape 2a easily. As can be seen in FIG. 1, another end portion of the guide track member 6 at the loading end position side is located so as to position the center of the guiding element 4 above the center line X—X at the height $h_1$. The starting portion of the guide track member 7 is, similarly to the guide track member 6, located such that the center of the tape guide is at the same height as the axial center of the magnetic tape, and the other end portion thereof is, as can be seen FIG. 1, located so as to position the center of the guiding element 5 below the center line X—X at the height of $h_2$. It is preferable that the respective displacements of the guiding elements 4 and 5 from the center line X—X are equal in magnitude. These displacement magnitudes are however not limited to equal distances.

While the tape cassette case is loaded, the magnetic tape 2a is pushed onto the capstan 9 by means of the pinch roller 11. The capstan is rotated by means of a capstan motor 12, which rotation causes the tape 2a to move from the supply reel table towards the take-up table through the rotary head drum 3 at a fixed speed. Preferably, a thin coreless motor is used to drive the capstan 9. Using a direct drive miniaturizes the recording and/or reproducing apparatus.

Figure 3:
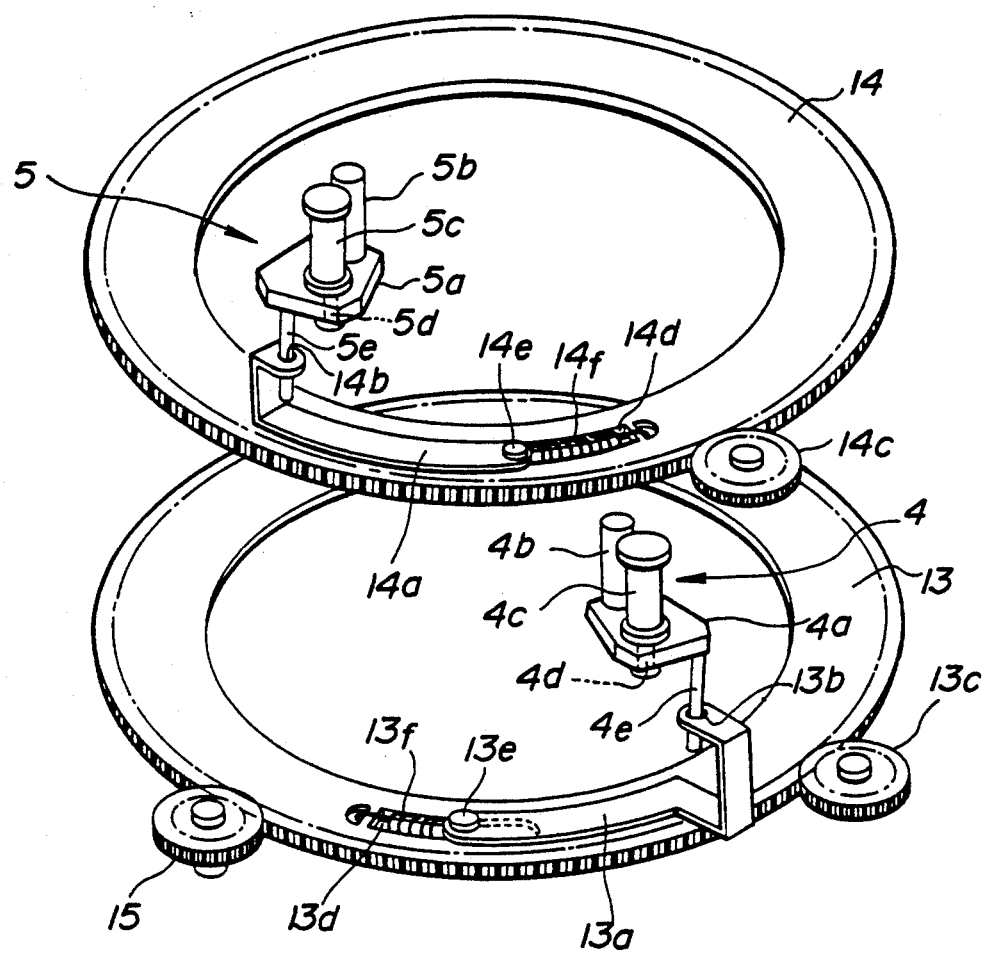
FIG. 3 is a exploded perspective view which shows tape guiding elements and a driving mechanism therefor.

Referring to FIG. 3, tape guiding elements 4 and 5 of a tape loading system and a driving mechanism therefor are illustrated. The tape guiding element 4 is provided with a loading table 4a on which a loading post 4b and a rotatable guide roller 4c are mounted and on the lower side of which a guide pin 4d for traveling in the groove 6a and a supporting pin 4e are installed. The tape guiding element 5 is of essentially the same construction as the element 4. A loading post 5b and a rotatable guide roller 5c are mounted on a loading table 5a, on the lower side of which a guide pin 5d for traveling in the groove 7a and a supporting pin 5e are installed. The supporting pins 4e and 5e are slidably inserted into through holes 13b and 14b provided on the end portion of supporting levers 13a and 14a mounted on loading ring gears 13 and 14 respectively. The guide pins 4d and 5d have flanges on their top ends, which prevent the loading tables 4a and 5a from derailing from the guide grooves 6a and 7a. It will be appreciated that the loading tables 4a and 5a may move along the predetermined loading paths defined by the grooves without derailing therefrom and that as the guide pins are moved the vertical displacement of the supporting pins 4e and 5e causes the tape 2a to be wrapped helically about the periphery of the rotary head drum 3.

The loading ring gears 13 and 14 are arranged around the rotary head drum 3 and are stacked close to each other. First, the loading ring gear 13 is rotated by a driving motor (not shown) via a pinion gear 15, which rotation of the ring gear 13 in turn causes a pinion gear 13c to rotate. The pinion gear 13c and a pinion gear 14c are mechanically connected via an intermediate gear (not shown) such that they rotate in opposite directions. For example, when the pinion gear 13c is rotated in the clockwise direction, the pinion gear 14c rotates in the counterclockwise direction and thereby causes the loading ring gears 13 and 14 to rotate in opposite directions. Thus, the tape guiding elements 4 and 5 are moved around the rotary head drum 3 in opposite directions to wrap the magnetic tape helically thereabout.

The loading levers 13a and 14a are rotatably connected to shafts 13e and 14e respectively. The shafts 13e and 14e each are slidable in arcuate elongated openings 13d and 14d formed in the ring gears 13 and 14 and are connected to the end of the openings 13d and 14d via coil springs 13f and 14f respectively. The coil springs 13f and 14f provide a biasing force for fixing the guiding elements 4 and 5 at the loading end positions respectively.

Figure 4:
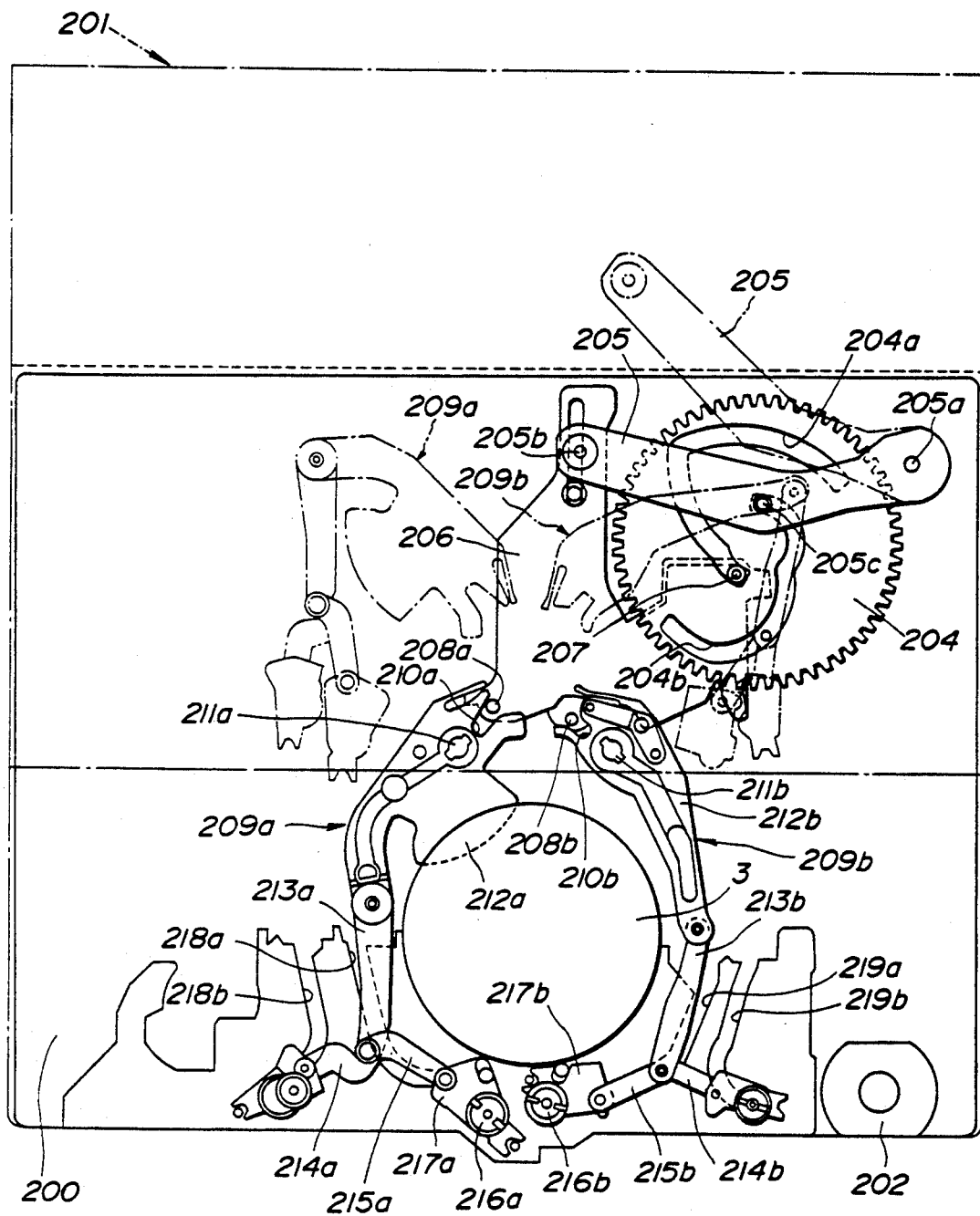
FIG. 4 is a simplified front elevation showing a second embodiment of a loading mechanism according to the invention.

Referring to FIG. 4, there is illustrated a second embodiment of a driving mechanism for the tape guiding elements 4 and 5 according to the invention. The second embodiment is suitable for 8 mm portable video camera.

A driving motor 202 is installed on a mechanical chassis 200 and drives a cam 204 through intermediate gears (not shown). The cam 204 has cam grooves 204a and 204b. A slide arm 205 functions as a cam follower. One end of the arm 205 is rotatably supported on the chassis 200 via a supporting pin 205a, while the other end thereof engages an opening (not shown), via a pin 205b secured thereon, provided in a cassette tape holder 201 indicated by a dotted line. In addition, an engaging pin 205c is fixed on the center portion of the arm 205 and engages in the cam groove 204b. The rotation of the cam 204 therefore causes the slide arm 205 to move according to the configuration of the cam groove 204b, which movement causes the cassette tape holder 201 to slide toward the rotary head drum 3. A slide plate 206 is provided on the mechanical chassis 200 and has engaging pins 207, 208a, and 208b. The pin 207 engages with the cam groove 204a. This engagement causes the slide plate 206 to move according to the configuration of the cam groove 204a. The pins 208a and 208b are adapted for engaging recesses 210a and 210b which are formed in a pair of tape guiding arms 209a and 209b respectively. The arms 209a and 209b pivot on the tape holder 201 about points 211a and 211b respectively. Moreover, the arms 209a and 209b comprise base arms 212a and 212b, middle arms 213a and 213b, and front arms 214a, 214b, 215a, and 215b respectively. They are pivotally connected to each other in articulated fashion. The arms 215a and 215b have guide plates 217a and 217b, on their ends, on which guiding elements 216a and 216b are supported. The guide plates 217a and 217b are adapted for sliding in guiding grooves 218a and 219a in the vicinity of the periphery of the rotary head drum 3.

The guiding groove 218a slopes downwardly and the guiding groove 219a slopes upwardly so that the tape guiding elements 216a and 216b are vertically shifted relative to each other at their respective end portions.

Therefore, when the tape cassette is inserted into the cassette holder 201 and then a driving motor switch (not shown) is turned on, the driving motor 202 rotates and thereby causes the cam 204 to rotate. This rotation of the cam, as described above, causes the slide arm 205 to swing from the position indicated by dotted line and the slide plate 206 to slide toward the rotary head drum 3 relatively slower than the swinging of the slide arm. Thus, the cassette holder 201 moves from the position indicated by the dotted line to the vicinity of the rotary head drum 3 together with the guiding element arms 209a and 209b, while the pins 208a and 208b engage with the recesses 210a and 210b respectively and then the guide plates 217a and 217b engage in the guiding grooves 218a and 219a. Thereafter, the slide plate 206 moves backwardly to a predetermined position defined by the cam 204 to rotate the guiding element arms 209a and 209b with respect to the points 211a and 211b respectively, allowing the guide plates 217a and 217b to slide in the guiding grooves 218a and 219a. Therefore, the guiding elements 216a and 216b become shifted in the vertical direction relative to each other at the front of the rotary head drum 3. It will be appreciated that the magnetic tape is therefore shifted vertically with respect to the center line of the rotary head drum 3 so as to be wrapped helically thereabout.

Conventional U-type loading systems use two helical wrapping techniques. In one of these helical wrapping techniques, a tape guiding element withdraws a section of the magnetic tape and moves upwardly around the rotary head drum so as to wrap it helically, while another guiding element withdraws another section of the magnetic tape and moves horizontally around the drum so the tape is wrapped around an upper portion of the head. In this technique, the height of the rotary head drum must be increased, causing the required thickness of the recording and/or reproducing apparatus case to increase.

In another technique, one tape guiding element withdraws a section of the magnetic tape and moves downwardly so as to wrap it helically about a portion of the periphery of the rotary head drum and the other moves horizontally. The loading operations other than in the above operations are the same as above apparatus. In the second case, the head drum must extend downwardly beneath the level of the cassette case again increasing the required thickness of the apparatus.

According to the invention, two guide track members for guiding the tape guide elements are provided, one of which slopes downwardly with respect to the center line x—x of the magnetic tape received in the cassette case and the other of which slopes upwardly with respect to the center line x—x. After the magnetic tape is withdrawn by means of the guiding elements, a section thereof moves upwardly around the rotary head drum and another section moves downwardly around the rotary head drum. As a result of these movements, the helical wrapping of the magnetic tape about the periphery of rotary head drum is achieved.

Therefore, in the above described loading system, the height of the rotary head drum may be reduced so the top does not project above the inner side of a roof over the access portion in the magnetic tape cassette case. Therefore, a substantial portion of the rotary head drum can be received within the access portion of the magnetic tape cassette case resulting in an overall reduction of unused space. Moreover, the tape guiding elements or so forth may be disposed within a small space defined by the height of the rotary head drum and the cassette case. It will be appreciated that compared with the conventional recording and/or reproducing apparatus, the overall size of the apparatus according to the invention may be reduced.

It will to be understood that the invention is not limited to the specifically disclosed embodiments, and various changes and modifications may be effected therein by one skilled in the art without departing from the scope or the invention as defined in the appended claims.

We claim:

1. A magnetic tape arrangement, for a recording and/or reproducing apparatus, for wrapping a magnetic tape passing through an access opening provided in a tape cassette casing helically about a portion of the periphery of a magnetic rotary head drum, comprising:
    a first guiding element for withdrawing a section of the magnetic tape from a tape casing received within the apparatus and shifting a longitudinal center line of the tape diagonally to a location adjacent a first point defined above a plane including the longitudinal center line of the tape when stored within the casing, and on the peripheral surface of the magnetic rotary head drum;
    a second guiding element for withdrawing a section of the tape from the tape casing and shifting the longitudinal center line of the tape diagonally to a location adjacent a second point defined below said plane and on the peripheral surface of the drum, said locations being about half of the tape width respectively above and below said longitudinal center axis, whereby the guiding elements are disposed in a small space defined by the length of the rotary drum and the casing; and
    means for moving the tape cassette casing toward the rotary head drum so as to receive at least a part of the drum within said access opening of the tape cassette casing.

2. An arrangement as set forth in claim 1, wherein a distance between said plane and said first point is equal to that between said plane and said second point.

3. An arrangement as set forth in claim 1, wherein said first and second guiding elements comprise articulated arms, and said first and second elements move along guiding grooves provided around the rotary head drum to guide the magnetic tape onto the drum.

4. A magnetic tape arrangement, for a recording and/or reproducing apparatus, for wrapping a portion of a magnetic tape passing through an access opening provided in a tape cassette casing onto a magnetic rotary head drum arranged substantially at a right angle to the mechanical chassis of the apparatus, comprising:
    a first guiding element for withdrawing a section of the magnetic tape stored within the casing receiving within the apparatus, said first element shifting a center line of said withdrawn section to a location below the center line of the magnetic tape when stored within the casing and wrapping the tape helically about the peripheral surface of the drum;
    a second guiding element for withdrawing a section of the magnetic tape, said second element shifting a center line of said withdrawn section to a location about the center line of the magnetic tape when stored within the casing and wrapping it helically about the peripheral surface of the drum, said locations being about one-half of the tape width below and above said center line, respectively; and
    means for moving the tape cassette casing toward the rotary head drum so as to receive at least a part of the drum within said access opening of the tape cassette casing.

5. A magnetic tape loading system, for a recording and/or reproducing apparatus, in which a magnetic tape is wrapped helically about a portion of the periphery of a magnetic rotary head drum, comprising:
    means for loading a magnetic tape cassette casing for the magnetic tape to a predetermined position in the vicinity of the magnetic rotary head drum of the apparatus, said casing having an access opening, and said means for loading including means for moving the casing toward the rotary head drum so as to receive at least a part of the drum within said access opening;
    a first guiding element for withdrawing a section of the magnetic tape from said casing and shifting a longitudinal center line of the tape diagonally to a location adjacent a first point defined above a plane including the longitudinal center line of the tape when stored within said casing and on the peripheral surface of the magnetic rotary head drum; and
    a second guiding element for withdrawing a section of the tape from said casing and shifting it diagonally to a location adjacent a second point defined below said plane and on the peripheral surface of the drum, said locations being within the width of said rotary drum.

6. A magnetic tape loading system according to claim 5, wherein said loading means comprises:
    a driven cam having a first cam groove; and
    a first cam follower in the form of a slide arm operatively engaging said first cam groove for providing power to said means for moving said casing.

7. A magnetic tape loading system according to claim 6, wherein said driven cam further comprises:
    a second cam follower in the form of a slide plate operatively engaging said second cam groove for providing power to move said first and second guiding elements; and
    first and second series of articulated arms, said first and second series of arms being operatively connected at one end to said first and second guiding elements, respectively, and having means for engaging said slide plate at an opposite end.

8. A magnetic tape loading system according to claim 7, wherein said first and second guiding elements are slidably mounted in first and second guiding grooves, respectively.

9. A magnetic tape loading system according to claim 8, wherein said first guiding groove slopes upwardly with respect to said center line of the tape, and said second guiding groove slopes downwardly with respect to said center line of the tape.

10. A magnetic tape loading system according to claim 9, wherein said first and second series of articulated arms each comprises a front arm, a middle arm, and a base arm, said front arm being pivotally connected between a respective one of said guiding elements and said middle arm, and said base arm being pivotally connected at one end to said middle arm and having said means for engaging said slide plate at an opposite end.

11. A magnetic tape loading system according to claim 5, wherein said loading means comprises a driven cam having first and second cam groove means, said first and second cam groove means being configured for moving said cassette casing into position adjacent said rotary head drum before said first and second guiding elements engage and withdraw the tape from said casing.

12. An apparatus for wrapping a portion of a magnetic tape withdrawn from a cassette casing in a standby position at a first location in a recording and/or reproducing apparatus about a rotary head drum arranged substantially at a right angle relative to the mechanical chassis of the apparatus when in a loading position, wherein said tape includes a longitudinal center line, said apparatus comprising:

first means, including a supply side guiding element, for withdrawing a portion of said magnetic tape from said magnetic tape cassette at said first location when said supply side guiding element of said first withdrawing means is in a standby position, said first withdrawing means further including a first guide means for shifting said supply side guiding element upwardly relative to the longitudinal center line of said tape as said supply side guiding element guided as said first guide means moves from said tape standby position to said tape loading position, said longitudinal center line of said tape in said loading position being positioned by said supply side guiding element diagonally at a location adjacent said rotary head drum and at a first plane above said longitudinal center in said standby position;

second means, including a takeup side guiding element, for withdrawing a portion of said magnetic tape from said magnetic tape cassette at said first location when said takeup side guiding element of said second withdrawing means is in a standby position, said second withdrawing means further including a second guide means for shifting said takeup side guiding element downwardly relative to the longitudinal center line of said tape as said takeup side guiding element as guided by said second guide means moves from said tape standby position to said tape locating position, said longitudinal center line of said tape in said loading position being positioned by said supply side guiding element diagonally at a location adjacent said rotary head drum and at a second plane below said longitudinal center in said standby position, said first plane and said second plane being spaced apart less than the width of said rotary drum whereby said tape is wrapped helically about a portion of the periphery of the rotary head drum; and means for moving the cassette casing toward the rotary head drum so as to receive at least a part of the drum within an access opening of the cassette casing whereby the size of said recording and/or reproducing apparatus is reduced.

13. The apparatus as set forth in claim 12 wherein said first guide means includes a guide track member coacting with said supply side guiding element, said guide track member being inclined upwardly with respect to the center line of said tape when in a standby position.

14. The apparatus as set forth in claim 12 wherein said second guide means includes a second guide track member coacting with said takeup side guiding element, said second guide track member being inclined downwardly with respect to the center line of said tape when in a standby position.

15. The apparatus as set forth in claim 12 where said first and said second guide means respectively include first and second guide track members respectively guiding said supply side and said takeup side guiding elements, said guide track members being respectively inclined upwardly and downwardly with respect to the longitudinal center line of said tape when in a standby position.

16. The apparatus as set forth in claim 12 wherein a distance of upward movement of said supply side guiding element is about equal to the downward movement of said takeup side guiding element, relative to said longitudinal center line of said tape in said standby position.

* * * * *